(12) United States Patent
Murayama et al.

(10) Patent No.: US 7,354,030 B2
(45) Date of Patent: Apr. 8, 2008

(54) IMPACT-ABSORBING MEMBER FOR VEHICLES

(75) Inventors: Masaru Murayama, Komaki (JP); Rentaro Kato, Kasugai (JP)

(73) Assignee: Tokai Rubber Industries, Aichi (JP)

( * ) Notice: Subject to any disclaimer, the term of this patent is extended or adjusted under 35 U.S.C. 154(b) by 0 days.

(21) Appl. No.: 11/527,517

(22) Filed: Sep. 27, 2006

(65) Prior Publication Data

US 2007/0085252 A1 Apr. 19, 2007

(30) Foreign Application Priority Data

Sep. 27, 2005 (JP) ............... 2005-280301

(51) Int. Cl.
  *B60R 19/03* (2006.01)
(52) U.S. Cl. ............ 267/140; 293/120; 293/133; 296/188; 280/751
(58) Field of Classification Search ............. 267/140, 267/153; 293/120, 133; 296/188; 280/748–751
  See application file for complete search history.

(56) References Cited

U.S. PATENT DOCUMENTS

| | | | | |
|---|---|---|---|---|
| 5,806,889 A | * | 9/1998 | Suzuki et al. | 280/748 |
| 5,857,702 A | * | 1/1999 | Suga et al. | 280/751 |
| 6,258,465 B1 | * | 7/2001 | Oka et al. | 428/599 |
| 2002/0149214 A1 | * | 10/2002 | Evans | 293/120 |
| 2003/0020290 A1 | * | 1/2003 | Cherry | 293/120 |
| 2004/0084910 A1 | * | 5/2004 | Amano et al. | 293/102 |

FOREIGN PATENT DOCUMENTS

| | | |
|---|---|---|
| EP | 0 530 042 B1 | 3/1993 |
| JP | A 06-144133 | 5/1994 |
| JP | A 06-171441 | 6/1994 |
| JP | A 2000-052897 | 2/2000 |
| JP | A 2001-010424 | 1/2001 |
| JP | A 2001-132787 | 5/2001 |
| JP | A 2004-090910 | 3/2004 |

* cited by examiner

*Primary Examiner*—Chris Schwartz
(74) *Attorney, Agent, or Firm*—Oliff & Berridge, PLC

(57) ABSTRACT

An impact-absorbing member includes tabular ribs extending in a direction orthogonal to an impact load input direction, and disposed spaced apart in the impact load input direction and parallel to one another; and a load transmitting member connected with width-wise opposite ends of the respective tabular ribs to extend between the tabular ribs on a diagonal with respect to the impact load input direction, for transmitting to each of the tabular ribs an impact load in a form of tensile load directed in a lateral direction, wherein differing levels are established for at least one of: tensile stiffness in the plurality of tabular ribs per se; and transmission efficiency of the tensile load by the load transmitting member, so that load-deformation characteristics of some of the plurality of tabular ribs differ in the impact load input direction.

17 Claims, 10 Drawing Sheets

F-S DIAGRAM

* TENSILE TEST PIECE WAS MEASURED WITH ITS LATERAL OPPOSITE ENDS PULLED IN THE DIRECTIONS INDICATED BY ARROWS.

IMPACT-ABSORBING MEMBER FOR VEHICLES

INCORPORATED BY REFERENCE

The disclosure of Japanese Patent Application No. 2005-280301 filed on Sep. 27, 2005 including the specification, drawings and abstract is incorporated herein by reference in its entirety.

BACKGROUND OF THE INVENTION

1. Field of the Invention

The present invention relates to an impact-absorbing member for vehicles, which is suitable for use in a car bumper, for absorbing impact during a collision in order to avoid personal injury.

2. Description of the Related Art

To date, impact-absorbing members of various kinds have been employed in vehicle body frames, for the purpose of absorbing impact during a collision in order to avoid personal injury. For example, bumpers for absorbing impact energy during an automobile collision are attached to the front and rear of the vehicle body frame. Such bumpers are typically composed of metallic crush boxes attached with screws or the like to the vehicle body frame, a metallic bumper beam mounted to the outside of the crush boxes, and a resin bumper fascia attached to the outside of the bumper beam.

During a mild collision occurring at low speed, a bumper of this kind will absorb the impact energy by means of elastic deformation of the pliable resin bumper fascia as it softly bumps against the impacted object. This can reduce the extent of damage to the impacted object, and can prevent injury to a pedestrian or the like. However, in order to prevent damage to the impacted object, the bumper fascia must undergo a sufficient level of elastic deformation, and a correspondingly large deformation space for the bumper fascia is required.

During a strong collision such as a high-speed collision between automobiles or a vehicle with a structural object, the large impact energy is absorbed through plastic deformation and collapse of the steel bumper beam and crush boxes. This can reduce the extent of damage to the vehicle body and injury to occupants. The bumper beam and crush boxes are typically fabricated of metal such as steel or aluminum based materials, and thus in order to avoid increased weight, are designed with a hollow structure having a hollow section in the interior. In order to improve the strength of the bumper beam, there have been employed various methods such as adding a reinforcing plate as taught in JP-A-6-171441, making the metal plate which forms the bumper beam thicker, or filling the hollow section in the bumper beam with an expanded elastomer such as expanded urethane or the like, as taught in JP-A-2001-132787.

In recent years, higher levels of pedestrian safety in the event that a pedestrian is hit have come to be required, and higher impact energy absorbing ability is now required in particular for bumpers with high risk of hitting pedestrians.

To meet this requirement, there has been proposed an energy absorbing member for personal safety use, which is designed to be able to produce deformation in the cross sectional direction necessary to absorb energy at low impact load comparable to hitting a person, as taught in JP-A-2004-90910. This energy absorbing member is composed of a front face flange and a rear face flange disposed substantially parallel to one another in the front/back direction of the vehicle body, and left and right webs connecting these flanges and disposed substantially parallel to one another. Each web comprises a hollow material of aluminum alloy which bows towards the outside. However, since this energy absorbing member is fabricated of hollow aluminum alloy, it will tend to have higher weight as compared to resin materials, which represents a disadvantage in terms of fuel consumption.

Also as impact-absorbing members for absorbing impact energy when relatively low impact load is input, there are known in the prior art to date molded articles of prescribed shape formed from resin materials. These impact-absorbing members fall into two broad classes.

One of these is expanded elastomers such as expanded urethane and expanded PP (polypropylene), used to fill the hollow section formed in the bumper for example (see FIG. 49 of JP-A-6-171441). However, with these expanded elastomers, a relatively flat characteristics curve is observed in a graph representing the relationship of load and the level of displacement when impact load is input, so while energy absorption efficiency is relatively good, there is the problem of appreciable collapse residuum and poor space efficiency.

The other class is a rib structure formed from PP, PE (polyethylene), ABS resin or the like. This rib structure absorbs energy by means of a rib positioned so as to extent in the direction of input of impact, and that undergoes bucking deformation during impact input. However, this rib structure has the problem that, since typically the initial impact load tends to be high, the impact on the impacted object will tend to be high. Also, since the rib structure is manufactured by means of injection molding, manufacturing costs for elongated materials will tend to be high.

With the foregoing in view, as a result of successful development of an automotive impact-absorbing member that upon input of low impact load exhibits good impact energy absorbing function and that can advantageously protect the human body, the inventors has been developed an automotive impact-absorbing member comprising tabular ribs of resin positioned so as to extend in the direction orthogonal to the impact load input direction; and a pair of plate holding parts connected respectively at a first end thereof to the two ends of the tabular ribs and disposed on the diagonal so as to approach one another at increasing distance away from the first end in the direction perpendicular to the tabular ribs, and functioning to induce tensile deformation of the tabular ribs during impact load input. This prior invention of the present inventors has been filed in Japanese Patent Office as Japanese Patent Application, and not yet laid open on the priority date of this application. This automotive impact-absorbing member is used by being mounted on the bumper etc. installed at the front and back of an automobile, and can effectively protect pedestrians.

The automotive impact-absorbing member discussed above, for use in an automobile bumper, is typically formed as an elongated tube of resin mounted on the automobile bumper so that the impact-absorbing member extends in the lateral direction. When an automobile on which the impact-absorbing member has been mounted in this way has a mild collision with a pedestrian at low speed, for reasons relating to the mounting location of the impact-absorbing member, it will in many cases hit the pedestrian's legs, and the pattern of impact against the impact-absorbing member tends to be various as well. Consequently, in the event of impact with a pedestrian's legs, relatively low impact load will be input in one portion of the impact-absorbing member in the lateral direction, and thus it is not always the case that impact occurs in such a way that the impact load is input over the entire impact-absorbing member. As a result of testing of an impact-absorbing member for use in protecting the legs of pedestrians, the inventors found that during deformation of the impact-absorbing member produced by impact, load tends to be excessively high in the rear half from the center.

SUMMARY OF THE INVENTION

It is therefore one object of this invention to provide an impact-absorbing member that is capable of assuring a large stroke and a high level of impact absorption energy, as well as ensuring a very high degree of freedom in tuning of the overall mode of deformation in the energy absorption process.

It is therefore another object of this invention to provide an impact-absorbing member that can be used appropriately as an automotive impact-absorbing member designed to exhibit good impact energy absorbing function during input of localized low impact load, such as that produced by hitting the legs of a pedestrian, so as to be able to more effectively protect the pedestrian's legs.

The above and/or optional objects of this invention may be attained according to at least one of the following modes of the invention. The following modes and/or elements employed in each mode of the invention may be adopted at any possible optional combinations. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

A first mode of the invention provides an elongated impact-absorbing member, which is made of synthetic resin material, and is adapted to be disposed in a load-receiving member struck by an impactor in a portion thereof that is struck by the impactor, the impact-absorbing member comprising: a plurality of tabular ribs extending in a direction orthogonal to an impact load input direction of impact load produced by striking by the impactor, and being disposed spaced apart in the impact load input direction and parallel to one another; and a load transmitting member connected with width-wise opposite ends of the respective tabular ribs so as to extend between the tabular ribs on a diagonal with respect to the impact load input direction, for transmitting to each of the plurality of tabular ribs the impact load in a form of tensile load directed in a lateral direction, wherein differing levels are established for at least one of: tensile stiffness in the plurality of tabular ribs per se; and transmission efficiency of the tensile load by the load transmitting member, so that load-deformation characteristics of some of the plurality of tabular ribs differ in the impact load input direction.

In the impact-absorbing member constructed in accordance with the present mode, by positioning the plurality of tabular ribs spaced apart from one another in the impact-absorbing member, large stroke and a high level of impact absorption energy can be assured, as well as being possible to ensure a very high degree of freedom in tuning of the overall mode of deformation in the energy absorption process. In particular, by establishing differing modes of tensile deformation among the plurality of tabular ribs, it is possible, for example, a) to hold deformation rigidity with respect to initial load to a low level, ensuring a high level of impact absorption (energy level) having attenuating action; and b) in the event that the planar contact area increases gradually as when a person is struck, to increase the effective impact absorption energy level with the aim of flattening the load-deformation characteristics. Where the ribs number three or more, "some of the plurality of tabular ribs" may refer to settings (i.e. tensile stiffness and transmission efficiency) for some of these being different from others. That is, it is not necessary for settings to differ mutually among all of the individual tabular ribs.

A second mode of the invention provides an elongated impact-absorbing member according to the first mode, wherein tensile stiffness in the plurality of tabular ribs per se are established at different levels by means of varying at least one of a dimension and a material of the ribs.

A third mode of the invention provides an elongated impact-absorbing member according to the first or second mode, wherein the plurality of tabular ribs are arranged such that overall tensile stiffness of the tabular ribs situated on a first side with respect to a center in the impact load input direction is greater in comparison to overall tensile stiffness of the tabular ribs situated on an other side, and wherein the impact-absorbing member is attached to the load-receiving member at the other side where the overall tensile stiffness of the tabular ribs is lower so that the impact load is input to the first side where the overall tensile stiffness of the tabular ribs is higher.

A fourth mode of the invention provides an elongated impact-absorbing member according to any one of the first through third modes, wherein the load transmitting member has symmetrical shape at opposite lateral sides with respect to lateral center lines of respective tabular ribs. Where the impact load input direction is oblique, the load transmitting portions need not be left-right symmetrical.

A fifth mode of the invention provides an elongated impact-absorbing member according to any one of the first through fourth modes, wherein the load transmitting member differs in shape from one side to an other side in the impact load input direction. With the impact-absorbing member according to this mode, during assembly of the component it is possible for the assembly worker to avoid misidentifying the side intended for mounting on the load-receiving member.

A sixth mode of the invention provides an elongated impact-absorbing member according to any one of the first through fifth modes, wherein the plurality of tabular ribs and the load transmitting member are integrally formed.

A seventh mode of the invention provides an elongated impact-absorbing member according to any one of the first through sixth modes, wherein the load transmitting member is arranged in a hollow tube shape overall, and includes tabular holding portions transmitting the impact load to the plurality of tabular ribs while having a shape producing bending moment that is outwardly convex during input of the impact load, respectively.

An eighth mode of the invention provides an automotive vehicle wherein an impact-absorbing member as disclosed in the first mode is positioned in an area that could possibly hit a person so as to extend along a surface of the load-receiving member between the load-receiving member and a surface cosmetic member of the automobile.

A ninth mode of the invention provides an automotive impact-absorbing member in a form of a molded article formed in prescribed shape of a resin material, comprising: a plurality of tabular ribs spaced apart from one another and arranged in parallel so as to extend in a direction orthogonal to an input direction of impact load; and a tubular member having an impact load input portion situated to a front side of the tabular ribs in the impact load input direction for receiving input impact load, and multiple pairs of tabular holding portions that are connected respectively at first ends thereof to opposite ends of the tabular ribs and disposed on a diagonal so as to approach one another at increasing distance away from the first end in a direction perpendicular to the tabular ribs, and that in association with deformation of the impact load input portion during impact load input induce in the tabular ribs tensile deformation such that the opposite ends of the tabular ribs move apart, wherein the plurality of tabular ribs are constituted such that those to back side in the impact load input direction have lower tensile yield load than those to the front side.

Tensile yield load herein refers to the maximum load at which a tensile test piece like that depicted in FIG. 12, when subjected to a tensile test, first begins to exhibit increasing elongational displacement without an increase in load. Specifically, in the model graph of load and displacement during tensile testing shown in FIG. 13, the peak value of the initial rise in load is the tensile yield load.

The impact-absorbing member of the present invention is typically of elongated shape formed of synthetic resin, and is used by being mounted on an automobile bumper or the like in a state of extending in the lateral direction, with the impact load input portion situated on the front side in the impact load input direction (i.e. to the outside of the automobile). The plurality of tabular ribs are arranged in parallel so as to extend in the direction orthogonal to the input direction of impact load and are attached so that, of the plurality of tabular ribs, those constituted so as to have low tensile yield load are situated further towards the back side in the impact load input direction. That is, the member is mounted in such a way that tabular ribs constituted so as to have low tensile yield load are always situated on the back side in the impact load input direction.

If, for example, due to hitting a pedestrian in the legs, the impact-absorbing member installed in this manner should experience input of relatively low impact load in a section of the impact load input portion situated to the front side in the impact load input direction, localized compressive deformation of the impact-absorbing member will be initiated starting from this section of the impact load input portion. In this case, while initially the area of contact of the pedestrian's leg against the impact load input portion is small, i.e. point contact, the area of contact increases over time. Thus, in the stage of initial deformation, the connecting end portions of the pair of tabular holding portions connected to the two ends of the first tabular rib situated furthest to the front in the impact load input direction experience displacement urging them apart from one another, thereby inducing in the first tabular rib tensile deformation pulling the two ends thereof further away.

Subsequently, as compressive deformation of the impact-absorbing member advances rearward in the impact load input direction, the second and third tabular ribs situated in that order from the front side in the impact load input direction, like the first tabular rib sequentially undergo tensile deformation pulling the two ends thereof further away, and the impact energy is effectively absorbed by means of the tensile deformation of these tabular ribs.

In this way, the impact energy is absorbed utilizing the good elongation characteristics and tensile characteristics of the resin tabular ribs, and thus there is no sudden increase in initial impact load; and since tensile deformation of the tabular ribs takes place continuously, the drop following the initial rise in impact load is very small, so that the impact energy is absorbed with good efficiency. Also, the tabular holding portions and the tabular ribs do not experience deformation so as to fold over in the impact load input direction, so collapse residuum is minimal, making it possible for a higher level of impact energy to be absorbed. Injury to the pedestrian's legs is reduced appreciably thereby, so that pedestrian safety is assured.

In the case of the automotive impact-absorbing member of the present invention in particular, as compressive deformation of the impact-absorbing member advances after striking the pedestrian's legs, the area of contact with the legs increases, and the load rises due to the increase size of the actually compressed section. However, since the tabular rib constituted so as to have low tensile yield load has been positioned to the back in the impact load input direction, which receives the load in the latter phase of deformation of the impact-absorbing member, the rise in load is restrained appropriately. Specifically, since the actual load is expressed as: (load per unit of surface area)×(compressed surface area), in the present invention, the load per unit of surface area of the tabular ribs situated to the back in the impact load input direction is lower. Consequently, in the latter half region of the chart representing the relationship of displacement level and load during impact load input, flat load characteristics closer to ideal are achieved. Accordingly, the impact-absorbing member of the present invention exhibits good impact energy absorbing function during localized input of low impact load caused by striking a pedestrian's legs or the like, so that the pedestrian is more effectively protected.

In the present invention, the plurality of tabular ribs positioned parallel to one another so as to extend in the orthogonal direction to the impact load input direction are constituted such that those to the back in the impact load input direction have lower tensile yield load than those to the front. Lower tensile yield load may be achieved by making the tabular ribs situated to the back side thinner than the tabular ribs situated to the front side, or by integrally forming the tabular ribs situated to the back side of resin material with lower tensile yield load than the tabular ribs situated to the front side, by employing a two-color molding process for example.

In preferred practice the tabular ribs in the present invention will be formed of resin material with tensile elongation at break of 100% or above and tensile yield stress of 15 Mpa or above. By so doing it is possible to ensure good characteristics with respect to tensile deformation of the tabular ribs induced to undergo tensile deformation by the tabular holding portions when impact load is input, so that good impact energy absorbing ability can be assured. Tensile elongation at break and tensile yield stress herein refer to tensile elongation at break and tensile yield stress as defined by JIS-K7162 standard.

In the present invention, the cross sectional shape of the tubular member constituted so as to have an impact load input portion and multiple pairs of tabular holding portions is not limited to circular or oval; a hexagon or other polygonal shape, or a combination of multiple polygons, can be employed as well. In this case, the plurality of tabular ribs are disposed in the interior of the tubular member, connected at their two lateral ends to the pairs of tabular holding portions at one end of each. This tubular member may be constituted so as to have a tabular connecting portion connecting together the ends of adjacent tabular holding portions in the circumferential direction.

In preferred practice, the thickness of this tabular connecting portion will be thicker than the tabular rib thickness, in order to better assure secure positioning of the other ends of the pairs of tabular holding portions during impact load input. In the tubular member constituted in this manner, the tabular connecting portion situated furthest to the back is utilized as a mounting fastener. In this case, a slit may be formed extending in the axial direction between the other ends of the pair of tabular holding portions situated furthest to the back so as to eliminate the tabular connecting portion thereof, and each of the tabular holding portions situated on either side of the slit furnished with a mounting fastener.

In the present invention, the impact load input portion furnished to the tubular member is positioned to the front side of the plurality of tabular ribs, in the impact load input direction. In preferred practice, this impact load input portion will have greater width in the circumferential direction than the tabular connecting portion located furthest to the back side. With this arrangement, the rigidity of the tabular connecting portion can be varied depending on differences in magnitude of tensile yield load of the tabular ribs, or on differences in rigidity levels of the pairs of tabular holding portions, making it possible for tensile deformation of the tabular ribs to take place more smoothly and reliably.

In the present invention, the multiple pairs of tabular holding portions provided to the tubular member is preferably constituted such that the pair of tabular holding portions connected to the two ends of the tabular rib situated to the back side in the impact load input direction have a smaller bending stiffness than do the pair of tabular holding portions connected to the two ends of the tabular rib situated to the front side. By means of this arrangement, the rigidity of the tabular holding portions can be varied in accordance with the difference in magnitude of tensile yield load of the tabular ribs, making it possible for tensile deformation of the tabular ribs to take place more smoothly and reliably.

In preferred practice, tabular holding portion thickness will be greater than tabular rib thickness. With this arrangement, sufficient rigidity of the tabular holding portions is assured, so that tensile deformation of the tabular ribs can be induced in a reliable manner. Additionally, by making the tabular holding portions thicker in the middle than at the two ends, sufficient rigidity of the tabular holding portions can be assured. In preferred practice the tabular holding portions will be formed of resin material having flexural modulus of 1 Gpa or above. By so doing, tensile deformation of the tabular ribs during impact load input can be induced in more a reliable manner. Herein, flexural modulus refers to flexural modulus as defined in the JIS-K7171 standard.

In a preferred mode of the impact-absorbing member of the present invention, the plurality of tabular ribs will comprise a first tabular rib situated to the front side in the impact load input direction, and a second tabular rib situated to the back side of the first tabular rib in the impact load input direction; and the tubular member will comprise an impact load input portion, a pair of first tabular holding portions connected respectively at one end thereof to the two ends of the first tabular rib and connected at the other end thereof to the two ends of the impact load input portion, a pair of second tabular holding portions connected respectively at one end thereof to the two ends of the second tabular rib, a first tabular connecting portion connecting together other ends of the pair of second tabular holding portions, an a pair of second tabular connecting portions connecting together the first pair of tabular holding portions and the one ends of the pair of second tabular holding portions. By so doing, compact structure with good space efficiency is afforded, and a preferred impact-absorbing member exhibiting good impact absorbing action can be fabricated easily.

In the present invention, examples of preferred resin materials for use is forming the molded article are UBE NYLON 6 (trade name of Ube Industries Ltd., product no. 1013IU50), PC (polycarbonate), PC/PBT (polybutyl terephthalate) alloy, PP (polypropylene), PE (polyethylene), ABS (acrylonitrile/butadiene/styrene), and the like. Of the aforementioned resin materials, the aforementioned UBE NYLON 6 has flexural modulus of 1 Gpa or above, tensile elongation at break of 100% or above, and tensile yield stress of 15 Mpa or above, and is especially preferred for this reason. Any of the methods known in the art can be used for the molding process; in particular, it is possible to use extrusion molding or other process advantageous for manufacturing elongated articles.

The impact-absorbing member of the present invention consists of a molded article formed in prescribed shape of a resin material and comprises a plurality of tabular ribs spaced apart from one another and arranged in parallel so as to extend in the direction orthogonal to the input direction of impact load, and a tubular member having an impact load input portion situated to the front side of the tabular ribs in the impact load input direction for receiving input impact load, and multiple pairs of tabular holding portions connected respectively at a first end thereof to the two ends of the tabular ribs and disposed on the diagonal so as to approach one another at increasing distance away from the first end in the direction perpendicular to the tabular ribs, and that in association with deformation of the impact load input portion during impact load input induce in the tabular ribs tensile deformation such that the two ends thereof move apart, wherein the plurality of tabular ribs are constituted such that those to back side in the impact load input direction have lower tensile yield load than those to the front side. Consequently, during deformation of the impact-absorbing member caused by localized input of low impact load due to striking a pedestrian's legs or the like, the rise in impact load in the latter phase of deformation can be restrained appropriately, good impact energy absorbing function can be attained, and the pedestrian can be more effectively protected.

BRIEF DESCRIPTION OF THE DRAWINGS

The foregoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
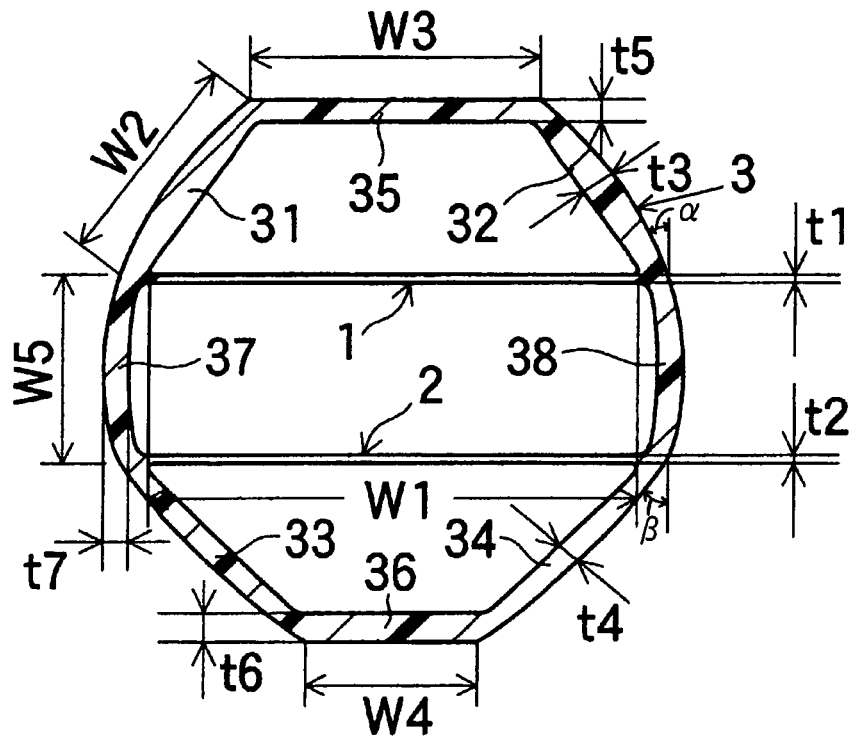
FIG. 1 is a transverse cross sectional view of an impact-absorbing member for use in an automotive vehicle, of construction according to a first embodiment of the invention.

The specific embodiments of the invention will be described hereinbelow with reference to the drawings. FIG. 1 is a cross sectional view taken in the axis-perpendicular direction of an automotive impact-absorbing member as a preferred embodiment of an impact-absorbing member according to this embodiment of the invention, and FIG. 2 is a perspective view of the automotive impact-absorbing member.

Figure 2:
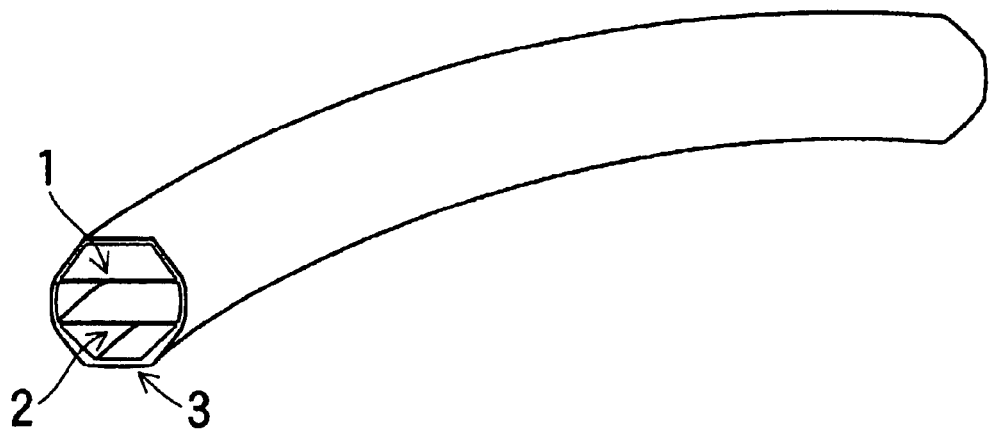
FIG. 2 is a perspective view of the impact-absorbing member of the first embodiment.

As shown in FIG. 1 and FIG. 2, the automotive impact-absorbing member of this embodiment of the invention is an elongated tubular molded article integrally formed of resin material, and is composed of two, i.e. first and second tabular ribs 1, 2 spaced apart from one another and arranged in parallel so as to extend in the direction orthogonal to the input direction of impact load, and a tubular member 3 having a pair of first tabular holding portions 31, 32 serving as load transmitting members, a pair of second tabular holding portions 33, 34 serving as load transmitting members, an impact load input portion 35, a first tabular connecting portion 36, and a pair of second tabular connecting portions 37, 38.

The first tabular rib 1 is formed with a tabular shape having thickness t1 of 0.8 mm and a width dimension W1 of 50 mm. The second tabular rib 2 is formed with a tabular shape having thickness t2 of 0.5 mm and a width dimension W1 the same as that of the first tabular rib 1. This second tabular rib 2, by being thinner than the first tabular rib 1, is constituted so as to have a low tensile yield load. The first tabular rib 1 and second tabular rib 2 are arranged parallel to each other across a distance equivalent to the width dimension W5 of the second tabular connecting portions 37, 38.

The tubular member 3 comprises the impact load input portion 35 which is situated on the first tabular rib 1 side; the pair of first tabular holding portions 31, 32 connected respectively at one end thereof to the two ends of the first tabular rib 1 and connected at the other end thereof to the two ends of the impact load input portion 35; the pair of second tabular holding portions 33, 34 connected respectively at one end thereof to the two ends of the second tabular rib 2; the first tabular connecting portion 36 connecting together other ends of the pair of second tabular holding portions 33, 34; a pair of second tabular connecting portions 37, 38 connecting together the first pair of tabular holding portions 31, 32 and the one ends of the pair of second tabular holding portions 33, 34. It is formed in the shape of a tube having an octagonal cross section.

The pair of first tabular holding portions 31, 32 are positioned on the diagonal so that their other ends approach one another at increasing distance away in the direction perpendicular to the first tabular rib 1, from the first ends which connect with the two ends of the first tabular rib 1. The pair of second tabular holding portions 33, 34 are positioned on the diagonal so that their other ends approach one another at increasing distance away in the direction perpendicular to the second tabular rib 2, from the first ends which connect with to the two ends of the second tabular rib 2. That is, the first and second tabular holding portions 31-34 are disposed in opposition on the diagonal in the impact load input direction. The first tabular rib 1 and the second tabular rib 2 are connected at one end thereof (the left side in FIG. 1) by one of the second tabular connecting portions 37, while the first tabular rib 1 and the second tabular rib 2 are connected at the other end thereof (the right side in FIG. 1) by the other second tabular connecting portion 38.

The first and second tabular holding portions 31-34 each have a flat inside face, and an outside face whose center portion bulges outwardly to form a bowed face, producing greater thickness in the center portion than at the two end portions. The thickness t3 of the center portion of the first tabular holding portions 31, 32 is 2.8 mm, while the thickness t4 of the center portion of the second tabular holding portions 33, 34 is 2.0 mm. Thus, the second tabular holding portions 33, 34 have thinner thickness overall than the first tabular holding portions 31, 32. The width dimension W2 of the first and second tabular holding portions 31-34 is 20 mm.

The impact load input portion 35 that connects together the first tabular holding portions 31, 32 at their other end, and the first tabular connecting portion 36 that connects together the second tabular holding portions 33, 34 at their other end each have a flat inside face and a flat outside face. The thickness t5 of the impact load input portion 35 is 2 mm, while the thickness t6 of the first tabular connecting portion 36 is 2.5 mm. The width dimension W3 of the impact load input portion 35 is 25 mm, while the width dimension W4 of the first tabular connecting portion 36 is 15 mm, so the impact load input portion 35 has greater width dimension than the first tabular connecting portion 36.

The pair of second tabular connecting portions 37, 38 have bowed inside faces and outside faces that bulge outwardly, unchanging thickness t7 of 2 mm, and width dimension W5 of 20 mm. Consequently, the wall thickness of the tubular member 3 comprising the first and second tabular holding portions 31-34, the impact load input portion 35, and the first and second tabular connecting portions 36-38 is greater than the thickness of the first and second tabular ribs 1, 2.

The impact-absorbing member of the embodiment is fabricated by cutting to prescribed dimensions an integrally formed extrusion-molded article of UBE NYLON 6 (trade name of Ube Industries Ltd., product no. 1013IU50), followed by a molding process to produce the prescribed bowed shape. With this arrangement, the first and second tabular holding portions 31-34 of the tubular member 3 are imparted with flexural modulus of 1 Gpa or above, while the first and second tabular ribs 1, 2 are imparted with tensile elongation at break of 100% or above and tensile yield stress of 15 Mpa or above. In the present embodiment, as mentioned previously, the second tabular rib 2 is thinner than the first tabular rib 1 so as to give it smaller tensile yield load.

Figure 3:
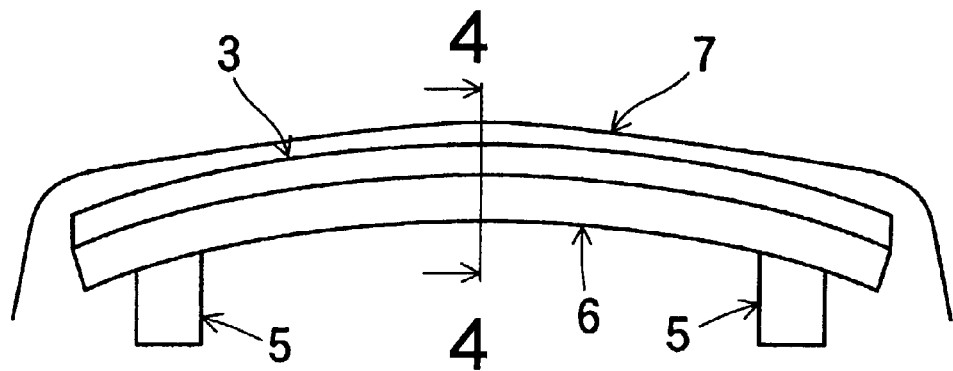
FIG. 3 is a plane view of the impact-absorbing member of the first embodiment that is mounted on a bumper of the vehicle.
Figure 4:
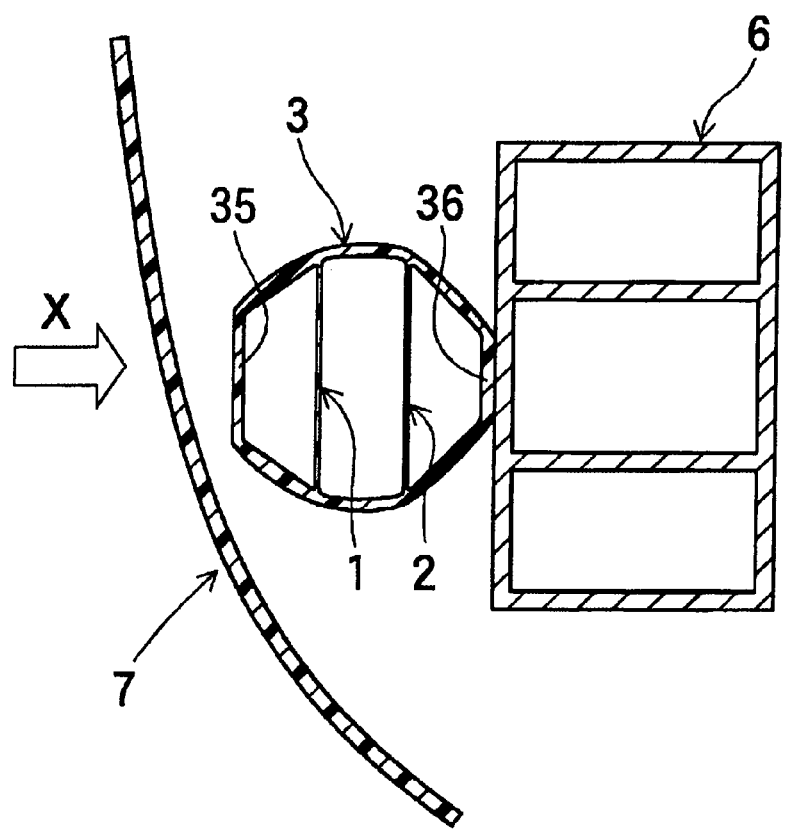
FIG. 4 is a cross sectional view taken along line 4-4 of FIG. 3.

The automotive impact-absorbing member of the present embodiment constituted as described above is employed for use in protecting pedestrians, by being mounted on the front and back bumpers of the automobile in the manner depicted in FIG. 3 and FIG. 4 for example, in such a way that the impact-absorbing member extends in the lateral direction. By means of affixing the outside face of the first tabular connecting portion 36 (which serves as the fastening portion) with an adhesive to the front face (or, in the case of the back of the vehicle frame, to the back face) of the steel bumper beam 6 which is attached to the vehicle frame (not shown) via a pair of crush boxes 5, 5, the impact-absorbing member is mounted so as to dispose between the bumper beam 6 and the bumper fascia 7 mounted on the outside thereof. In this case, the impact-absorbing member is mounted such that the impact load input portion 35 is situated to the front side in the direction of input of impact load (i.e. the bumper fascia 7 side), and the first and second tabular ribs 1, 2 are situated extending in the direction (i.e. the vertical direction) that is generally orthogonal to the direction of input of impact load (primarily the direction indicated by the arrow x in FIG. 4).

In the event that an automobile having this impact-absorbing member installed thereon should impact the legs of a pedestrian while driving at low speed so that relatively low impact load is input to the bumper fascia 7, displacement of the bumper fascia 7 occurring in association with elastic deformation will result in the impact load thereof being input to one section in the lateral direction of the impact load input portion 35 of the impact-absorbing member. By means of the one section of the impact load input portion 35 being pushed by the bumper fascia 7, the impact-absorbing member will begin to undergo localized compressive deformation from the front side in the impact load input direction. In this case, while the area of contact with the impact load input portion 35 is initially very small (point contact), the planar area of contact increases with time. Thus, since the first tabular holding portions 31, 32 are disposed in opposition on the diagonal towards the impact load input direction, in the initial stage of deformation, the first tabular holding portions 31, 32, the first tabular rib 1 (which of the plurality of tabular ribs is situated furthest to the front in the impact load input direction) will undergo tensile deformation such that the two ends thereof move apart from one another, due to displacement of the pair of first tabular holding portions 31, 32 connected to the two ends thereof, such that the connecting ends thereof move apart from one another.

Subsequently, as compressive deformation of the impact-absorbing member progresses, the second tabular rib 2 situated to the back of the first tabular rib 1 in the impact load input direction begins to undergo tensile deformation such that the two ends thereof move apart from one another, due to displacement of the pair of second tabular holding portions 33, 34 which are disposed in opposition on the diagonal towards the impact load input direction and connected to the two ends thereof, such that the connecting ends of the second tabular holding portions move apart from one another. The impact energy is thus effectively absorbed through tensile deformation of the first and second tabular ribs 1, 2.

Since the elongation properties and tensile properties of the resin first and second tabular ribs 1, 2 are utilized to absorb impact energy in this way, there is no sudden increase in initial impact load. Further, since tensile deformation of the first and second tabular ribs 1, 2 takes place continuously, the drop in impact load in the initial period is very small, so that the impact energy is absorbed with very good efficiency. Also, in the structure of the impact-absorbing member of the present embodiment, the first and second tabular holding portions 31-34 and the tabular ribs 1, 2 do not experience deformation so as to fold over in the impact load input direction, so collapse residuum is minimal, making it possible for a high level of impact energy to be absorbed even in limited installation space. Injury to the legs of a pedestrian who is struck is reduced appreciably thereby, and pedestrian safety is assured.

In the case of this impact-absorbing member in particular, as the area of contact with the legs of the pedestrian increases as compressive deformation of the impact-absorbing member progresses, the load rises due to the increase size of the actually compressed section. However, since the second tabular rib 2, which has been constituted so as to have low tensile yield load, is positioned to the back in the impact load input direction which receives the load in the latter phase of deformation of the impact-absorbing member, the rise in load is restrained appropriately. Specifically, since the actual load is expressed as: (load per unit of surface area)×(compressed surface area), in the impact-absorbing member of the present embodiment, the load per unit of surface area of the second tabular rib 2 situated to the back in the impact load input direction is lower. Consequently, as will be demonstrated clearly by the results of testing to be described later, in the latter half region of the chart representing the relationship of displacement level and load during impact load input (see FIGS. 10A-10F), flat load characteristics closer to ideal are achieved. Accordingly, the impact-absorbing member of the present embodiment exhibits good impact energy absorbing function when low impact load has been input, so that the legs of the pedestrian are more effectively protected.

As discussed above, the impact-absorbing member of the present embodiment comprises a molded article integrally formed of resin material, and is composed of two first and second tabular ribs 1, 2 extending parallel to one another in the direction orthogonal to the impact load input direction; and a tubular member 3 having first and second tabular holding portions 31-34 connected respectively at a first end thereof to the two ends of the first and second tabular ribs 1, 2 and inducing tensile deformation of the first and second tabular ribs 1, 2 when load is input, and therefore can exhibits good impact energy absorbing function when loaded at low impact load, so that pedestrians can be protected reliably and advantageously.

In the impact-absorbing member of the present embodiment in particular, the two first and second tabular ribs 1, 2 extending parallel to each other are constituted such that the second tabular rib 2 which is situated to the back in the impact load input direction is thinner and consequently has a smaller tensile yield load than the first tabular rib 1 which is situated to the front. Thus, in the latter phase of deformation of the impact-absorbing member the rise in load can be restrained appropriately, and thus the legs of the pedestrian can be protected more effectively.

Additionally, since the impact-absorbing member of the present embodiment can be integrally fabricated by means of an extrusion molding process advantageous for the manufacture of elongated articles, increased manufacturing costs can be avoided.

Figure 5:
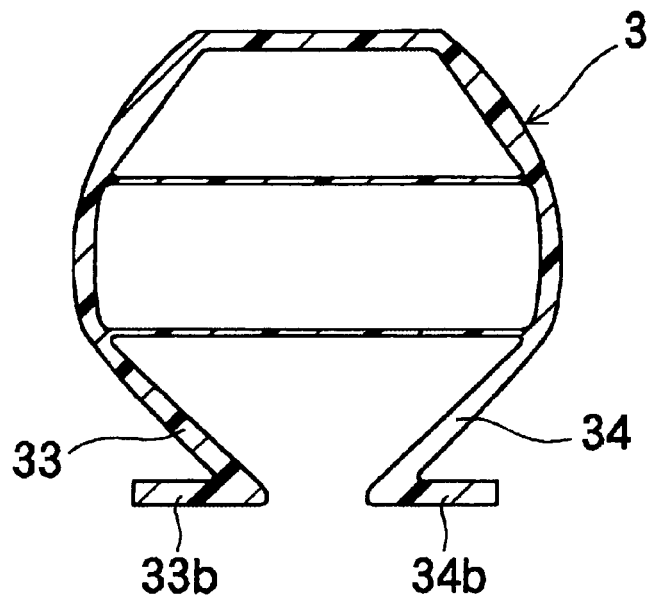
FIG. 5 is a transverse cross sectional view of an impact-absorbing member for use in an automotive vehicle, of construction according to a second embodiment of the invention.

The impact-absorbing member of the embodiment described hereinabove is constituted so as to be mounted and fastened with the outside face of the first tabular connecting portion 36 of the tubular member 3 being affixed with adhesive to the bumper beam 6. However, as depicted in FIG. 5 for example, a slit extending in the axial direction could be formed between the pair of second tabular holding portions 33, 34 so as to eliminate the first tabular connecting portion 36, and fastening portions 33b, 34b disposed on the respective ends of the pair of second tabular holding portions 33, 34 lying along the slit.

Figure 6:
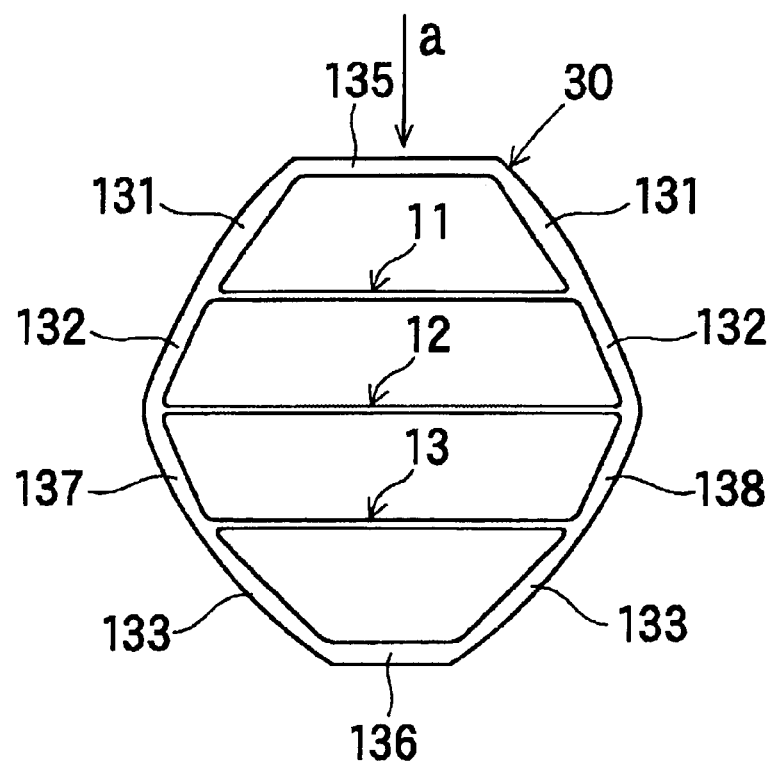
FIG. 6 is a transverse cross sectional view of an impact-absorbing member for use in an automotive vehicle, of construction according to a third embodiment of the invention.
Figure 7:
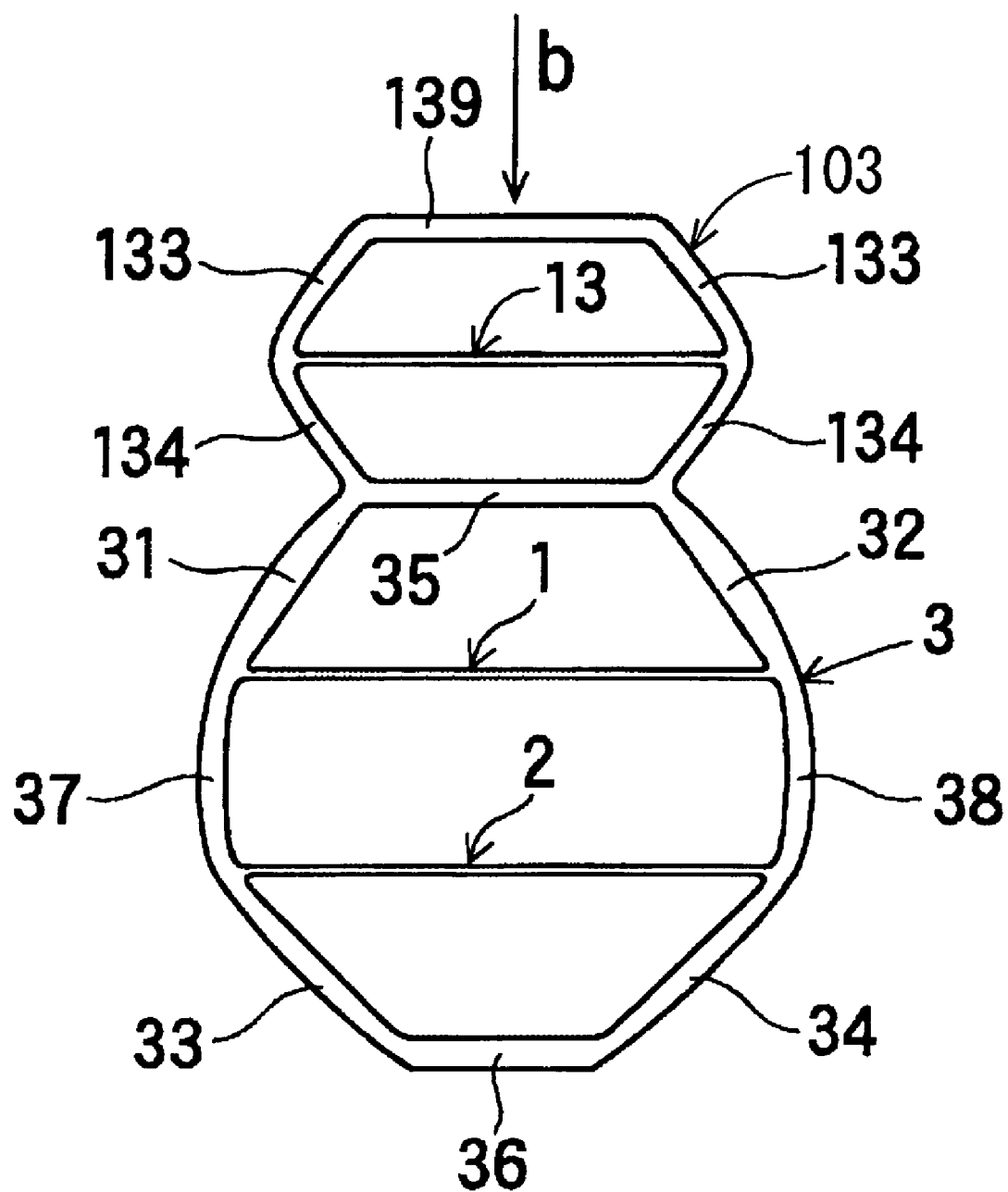
FIG. 7 a transverse cross sectional view of an impact-absorbing member for use in an automotive vehicle, of construction according to a fourth embodiment of the invention.

Additionally, while the impact-absorbing member of the embodiment described hereinabove has two first and second tabular ribs 1, 2 which differ in thickness, as depicted in FIG. 6 and FIG. 7 for example, it could instead be constituted so as to have three first to third tabular ribs 11, 12, 13 which differ in thickness. In this case as well, by constituting the tabular ribs situated to the back in the impact load input direction so as to have smaller tensile yield load than those situated to the front, operation and effects analogous to those of the impact-absorbing member of the embodiment described above can be attained.

The impact-absorbing member shown in FIG. 6 is composed of three first to third tabular ribs 11-13 disposed spaced apart and parallel to one another so as to extend in the direction orthogonal to the impact load input direction (direction indicated by the arrow a). A tubular member 30 of polygonal tube shape having a pair of first tabular holding portions 131, 131, a pair of second tabular holding portions 132, 132, a pair of third tabular holding portions 133, 133, an impact load input portion 135, and first and second tabular connecting portions 136-138. Here, the first tabular rib 11 having the greatest thickness and highest tensile yield load is situated at furthest to the front in the impact load input direction, while the third tabular rib 13 having the smallest thickness and lowest tensile yield load is situated at furthest to the back in the impact load input direction. The first tabular holding portions 131, 131 situated at furthest to the front in the impact load input direction are constituted with the greatest thickness so as to have the highest rigidity, while the third tabular holding portions 133, 133 situated at furthest to the back in the impact load input direction are constituted with the thinnest thickness so as to have the lowest rigidity.

The impact-absorbing member shown in FIG. 7 has a structure wherein the impact-absorbing member of the embodiment described hereinabove and shown in FIG. 1 has further attached thereto a single third tabular rib 13. Further, a tubular member 103 having a pair of third tabular holding portions 133, 133 connected respectively at a first end thereof to the two ends of the third tabular rib 13 and positioned to one side of the third tabular rib 13, and a pair of fourth tabular holding portions 134, 134 connected respectively at a first end thereof to the two ends of the third tabular rib 13 and positioned to the other side of the third tabular rib 13. In this case, the third tabular rib 13 is situated to the front side of the first tabular rib 1 in the impact load input direction (direction indicated by the arrow b), and is constituted with greater thickness than the first tabular rib 1 so as to have the highest tensile yield load. The third tabular holding portions 133, 133 and the fourth tabular holding portions 134, 134 have identical thickness and width dimension. A third tabular connecting portion 139 which connects together the third tabular holding portions 133, 133 at their other end has the same thickness and width dimension as the impact load input portion 35, and in the case of this impact-absorbing member is situated furthest to the front side in the impact load input direction, so that the third tabular connecting portion 139 serves as the impact load input portion, instead of the impact load input portion 35.

Figure 8:
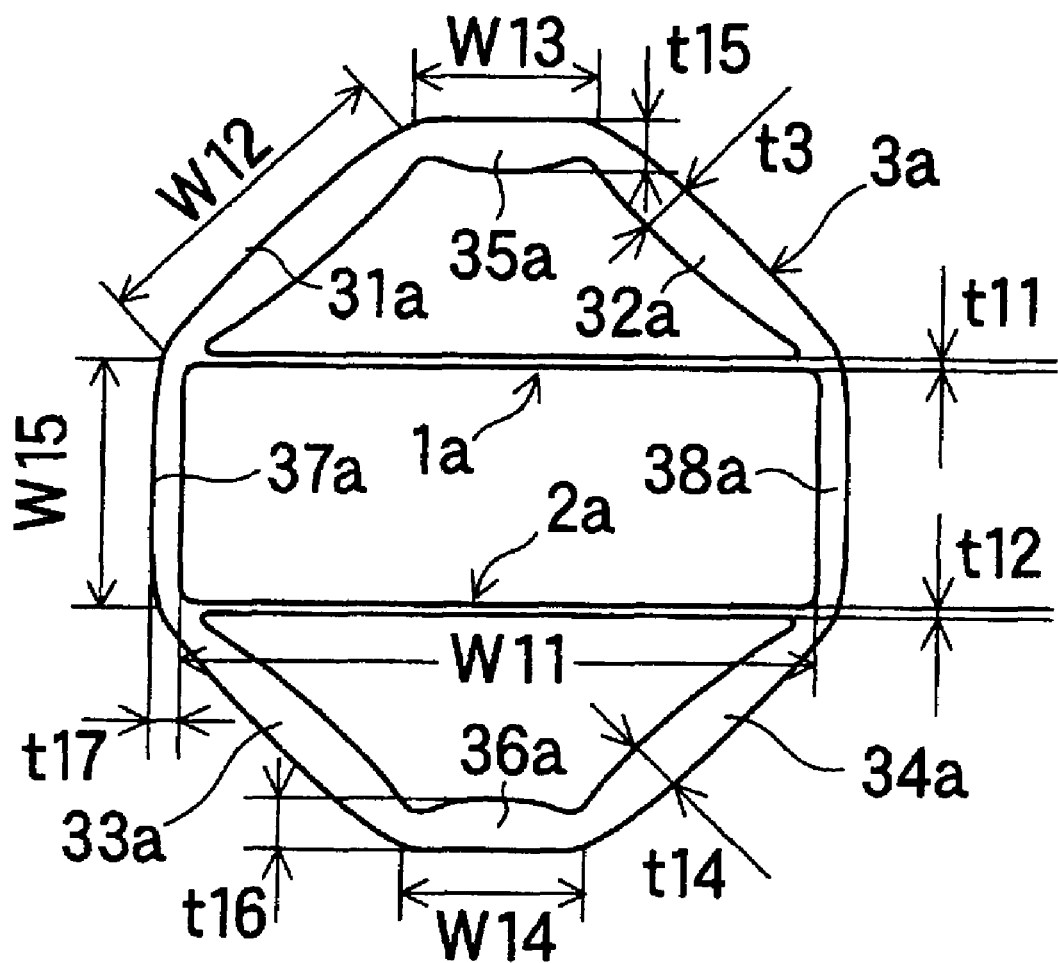
FIG. 8 is a view for explaining a configuration and dimensions of a comparative example examined in the test.

In order to demonstrate the excellent working effects of the automotive impact-absorbing member of the present invention, the impact-absorbing member of the aforementioned embodiment depicted in FIG. 1 was prepared to serve as a working example, and the impact-absorbing member shown in FIG. 8 was prepared as a comparative example. These were then tested to determine impact energy absorbing capability. The comparative example member was of hexagonal tubular shape made of the same resin material as that of the working example; as depicted in FIG. 8, it is composed of a first tabular rib 1a and a second tabular rib 2a disposed parallel to one another so as to extend in the direction orthogonal to the impact load input direction; and a tubular member 3a comprising a pair of first tabular holding portions 31a, 32a, a pair of second tabular holding portions 33a, 34a, an impact load input portion 35a, and first and second tabular connecting portions 36a-38a.

This comparative example differs appreciably from the working example in that the thickness t11 of the first tabular rib 1a and thickness t12 of the second tabular rib 2a is set to 0.9 mm, the same for each. The width dimension W11 of the first and second tabular ribs 1a, 2a is 50 mm. The thickness t13 of the first tabular holding portions 31a, 32a at their center portion and the thickness t14 of the second tabular holding portions 33, 34 at their center portion are the same, namely 3.3 mm, while the width dimension W12 of the first and second tabular holding portions 31a-34a is 25 mm. The impact load input portion 35a and the first tabular connecting portion 36a have flat outside faces, while their inside faces are bowed faces that bulge inwardly at the center portion. The thickness t15, t16 in their center portion is 3 mm, the same for each. The second tabular connecting portions 37a, 38a have flat inside faces and outside faces and unchanging thickness t17 of 2 mm, while the width dimension W15 thereof is 18 mm.

Figure 9A:
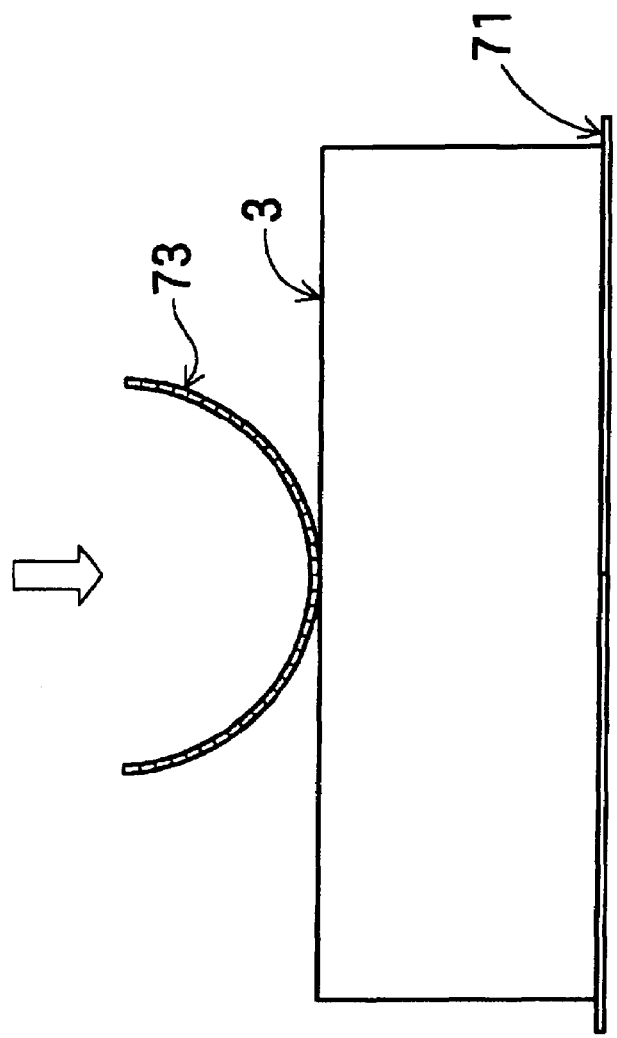
FIGS. 9A and 9B is views suitable for explaining ways of the test.
Figure 9B:
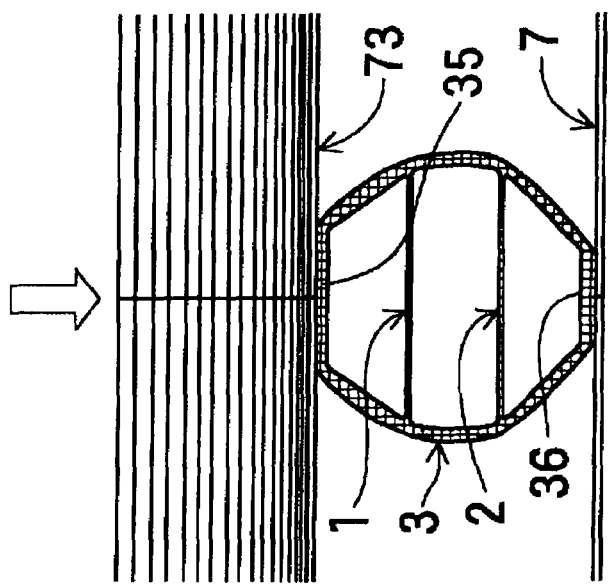
Figure 10A:
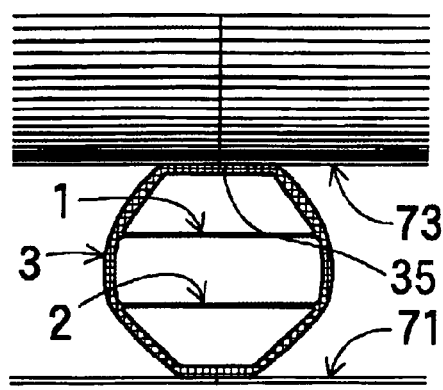
FIGS. 10A to 10F shows state of deformation of an example of the present impact-absorbing member and a comparative example, at respective stage during input of impact load.
Figure 10B:
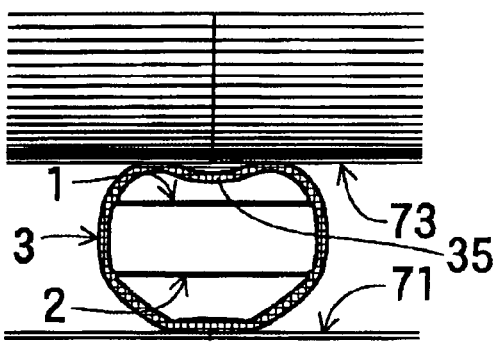
Figure 10C:
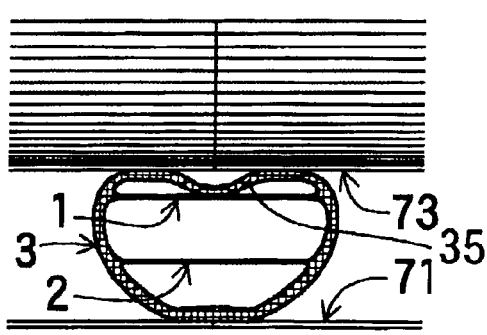
Figure 10D:
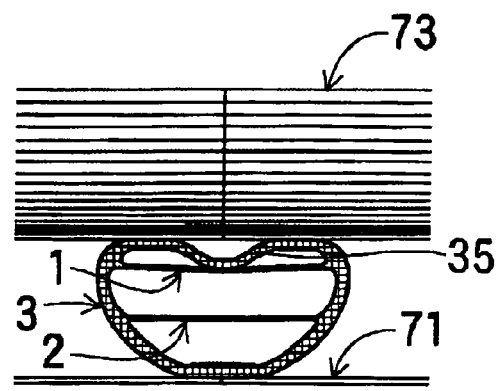
Figure 10E:
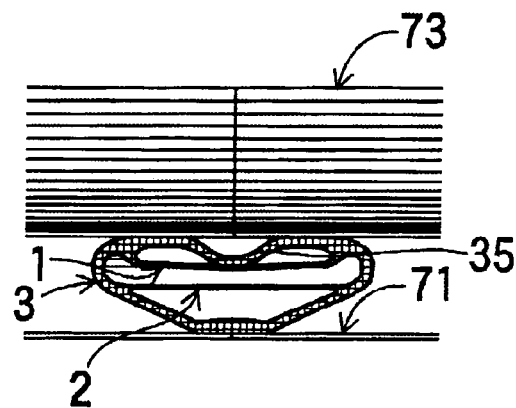
Figure 10F:
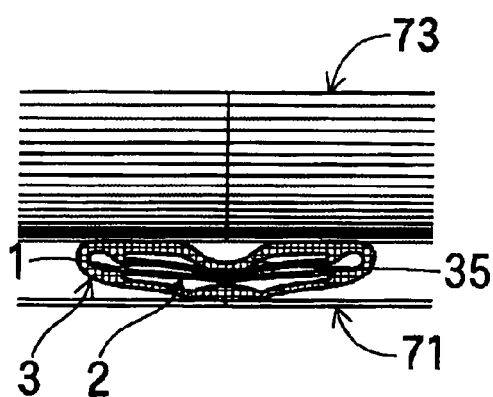
Figure 11:
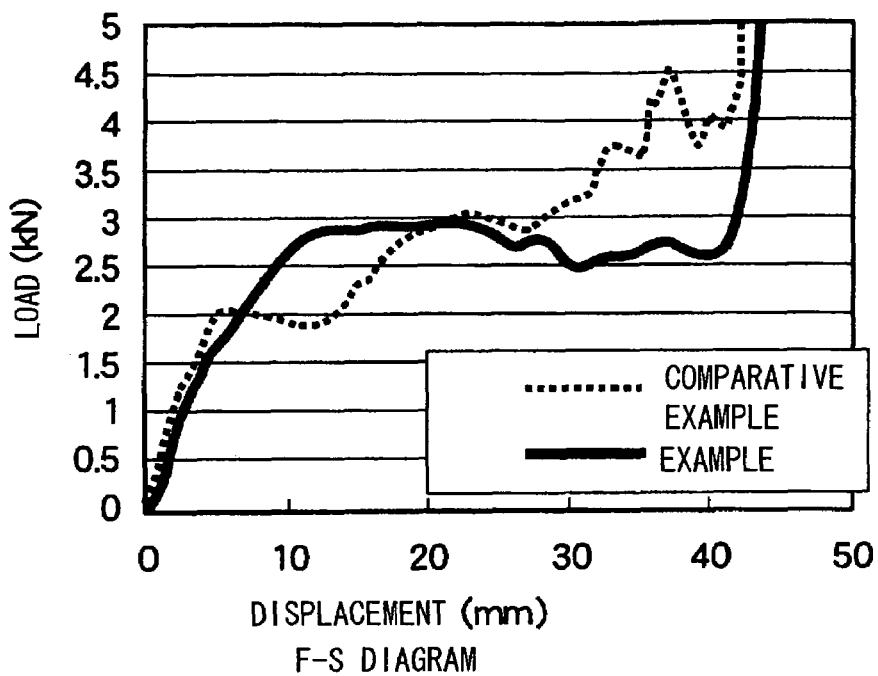
FIG. 11 is a graph demonstrating load-displacement relationships examined in the example and the comparative example.
Figure 12:
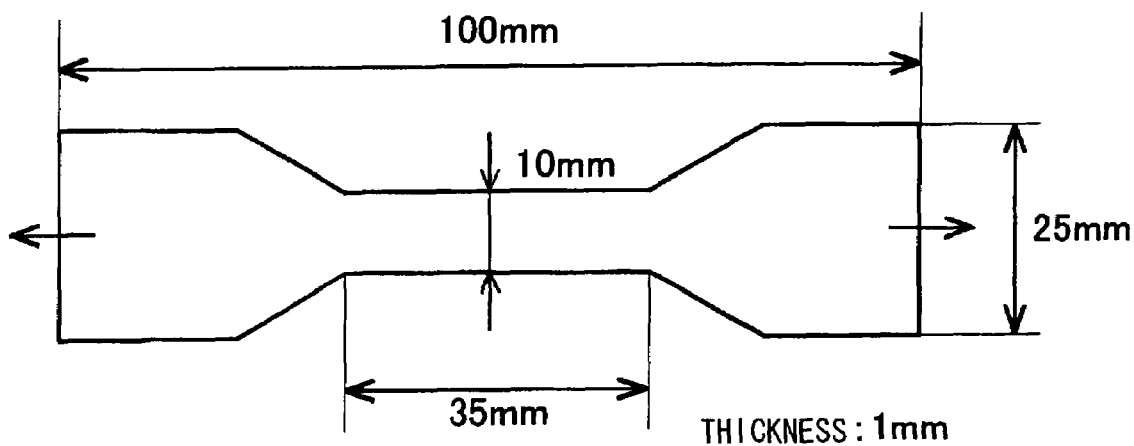
FIG. 12 is a view for explaining a configuration and dimensions of a tensile test peace used in the tensile test.
Figure 13:
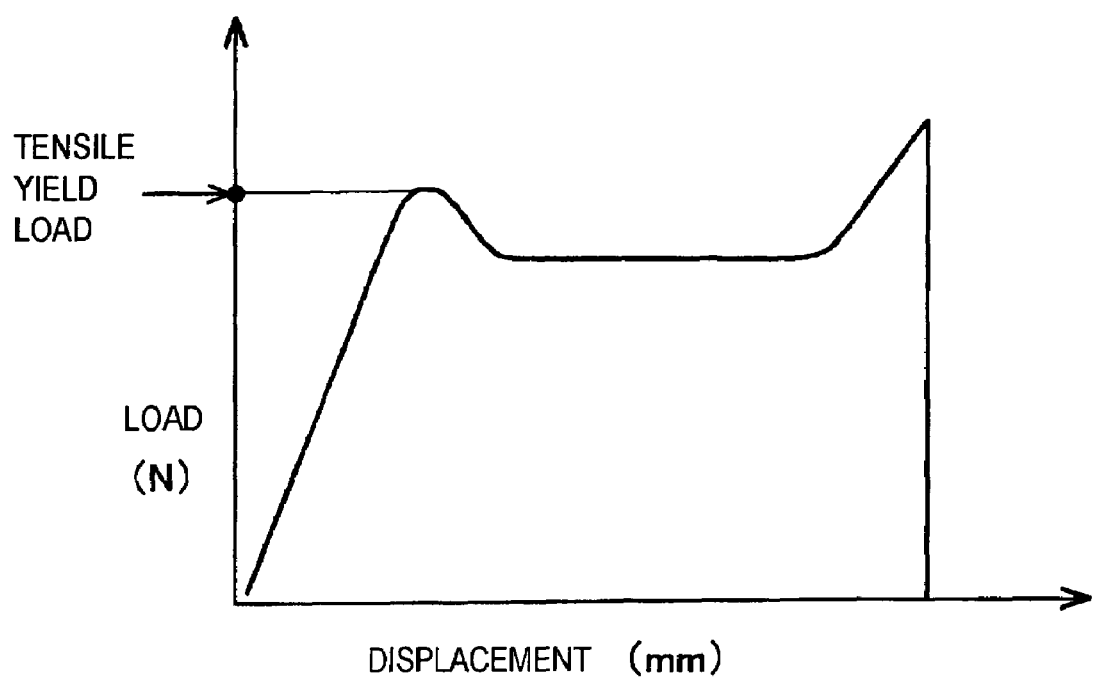
FIG. 13 is a graph for demonstrating a load-displacement relationship of the test piece subjected to the tensile test.
Figure 14:
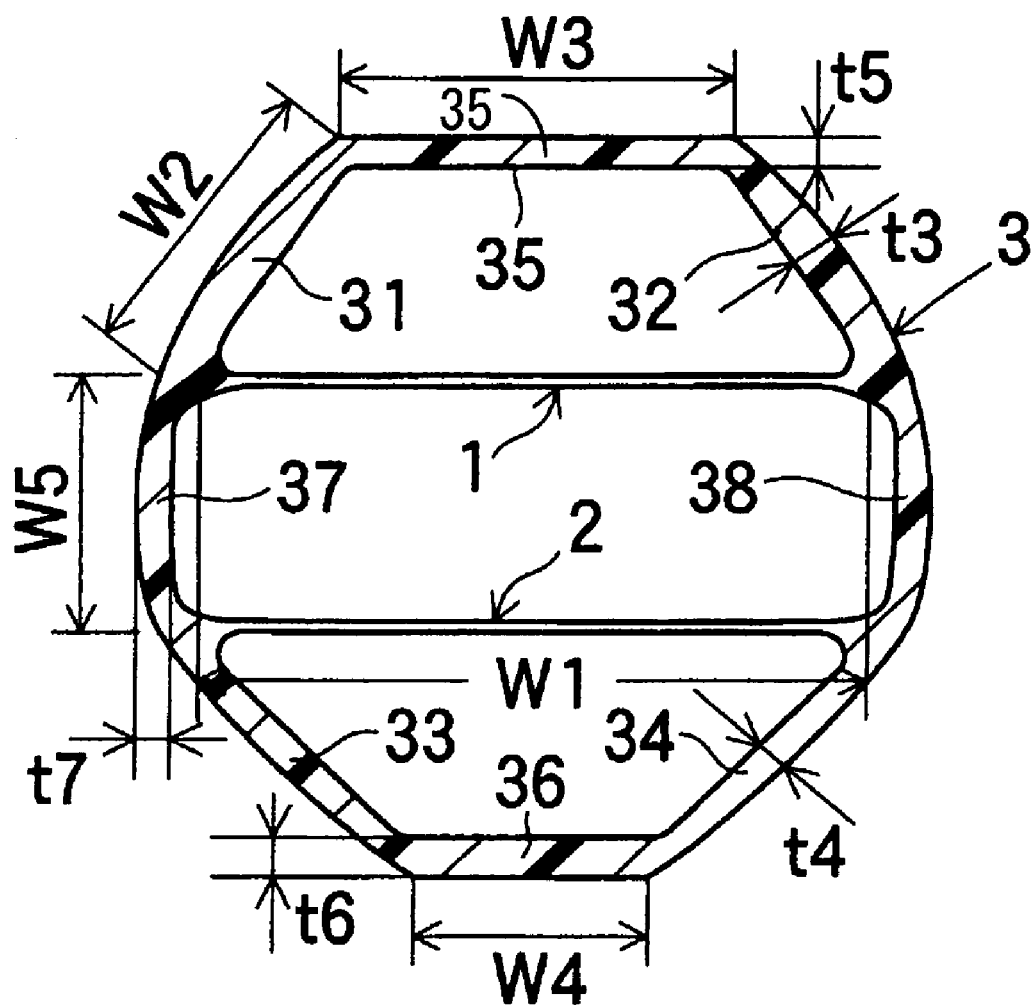
FIG. 14 is a transverse cross sectional view of an impact-absorbing member for use in an automotive vehicle, of construction according to yet another embodiment of the invention.

As shown in FIGS. 9A and 9B, the test is carried out with the test piece arranged on the upper face of a metal plate 71, affixed thereto at the first tabular connecting portion 36 (36a) of the test piece. The test piece was loaded from above with an impact load produced by a tubular striker 73 70 mm in diameter and 200 mm in length, impacted at a speed of 3 m/s in a direction intersecting the test piece at a right angle, while measuring the relationship of the load value (kN) applied by this load, with deformation (mm) produced in the sample at that time. Results are shown in FIG. 11. In FIG. 11, the level of energy absorption by each test piece is equivalent to the area of the region bounded by the characteristic curve of each and the horizontal axis indicating the rate of deformation. A larger area is evaluated as having a greater level of energy absorption. FIGS. 10A-10F depict the manner of deformation of the impact-absorbing member pertaining to the working example induced by impact load input, shown stepwise in sequence from FIG. 10A to FIG. 10F.

As will be apparent from FIG. 11, in the case of the comparative example, in the initial stage of loading the load value rose sharply up to 2 kN, then flattened out until reaching a deformation level of about 13 mm. Thereafter, the load value rose moderately up to a deformation level of about 25 mm, with the load value subsequently rising sharply up to a deformation level of about 40 mm. That is, in the case of the comparative example, the load value rose appreciably in the latter half in association with a deformation level of 25 mm and above, and thus would cause appreciable injury to the legs of a pedestrian.

In the case of the working example, on the other hand, as will be apparent from FIG. 11, in the initial stage of loading the load value rose sharply up to close to 3 kN, then flattened out until reaching a deformation level of about 25 mm. Subsequently the load value maintained a flat level at about 2.7 kN up to a deformation level of about 40 mm, with a sharp rise in the load value thereafter. That is, in the case of the working example, while the slope of the initial rise in load value is somewhat more moderate than that of the comparative example, the load value rises greatly up to close to 3 kN, and thereafter the load value maintains a highly flat state without appreciable fluctuation up to a deformation level of about 40 mm, affording load characteristics that are close to ideal.

In particular, it will be appreciated that within a deformation level range of 25-40 mm which represents the latter phase of deformation of the impact-absorbing member, the rise in load value is markedly restrained as compared with the comparative example. The reason for this large difference lies in the fact that, in the comparative example, the first tabular rib 1*a* and the second tabular rib 2*a* have identical thickness, whereas in the working example, the second tabular rib 2 situated to the back side in the impact load input direction is thinner and has smaller tensile yield load than the first tabular rib 1 situated to the front side. In the case of the working example as well, there was attained a level of impact energy absorption generally equal overall to that of the comparative example.

As depicted in FIGS. 10A-10F, during localized compressive deformation of the impact-absorbing member of the working example due to input of impact load, deformation is initiated on the impact load input portion 35 side (striker 73 side) of the tubular member 3. As compressive deformation of the impact-absorbing member progresses towards the back side in the impact load input direction, tensile deformation is induced in order from the first tabular rib 1 situated to the front side in the impact load input direction, to the second tabular rib 2 situated to back side. By means of this continuous tensile deformation of the first and second tabular ribs 1, 2, impact energy is absorbed with good efficiency, so a high level of absorption of impact energy is attained.

From the preceding, it will be apparent that by constituting the second tabular rib 2 situated to back side in the impact load input direction so as to have a lower tensile yield load than the first tabular rib 1 situated to the front side, as is done in the working example, the rise in impact load in the latter phase of deformation of the impact-absorbing member can be restrained appropriately, and thus the legs of a pedestrian can be protected more effectively, and there is obtained an impact-absorbing member that is optimal in terms of protecting pedestrian legs.

While the present invention has been described in detail in its presently preferred embodiment, for illustrative purpose only, it is to be understood that the invention is by no means limited to the details of the illustrated embodiment, but may be otherwise embodied.

For instance, in the illustrated embodiments, the principle of the present invention has been applied to an automotive impact-absorbing member, but it is also applicable to vehicles other than the automotive vehicle.

In the illustrated embodiment, load-deformation characteristics of the plurality of tabular ribs differ in the impact load input direction by adjusting tensile stiffness, more specifically, tensile yield load in the plurality of tabular ribs per se. Alternatively, the load-deformation characteristics of the tabular ribs can be changed by adjusting transmission efficiency of the tensile load by the load transmitting member. For instance, as shown in FIG. 1, the load transmitting member in the form of first and second tabular holding portions 31-34 are connected to the first and second tabular ribs 1, 2 at different angles $\alpha \cdot \beta$. These angles may be suitably adjusted to give desired transmission efficiency of the tensile load to the load transmitting member. In the embodiment in FIG. 1, even if the first and second tabular ribs 1, 2 are the same in shape and material characteristics, the different transmission efficiencies of the tensile load can be provided to the first and second tabular ribs 1, 2, by meeting the relationship of $\alpha<\beta$.

In the illustrated embodiments, each tabular rib has the constant thickness over its entire length. It is to be understood that the present invention includes a tabular rib having variable thickness as well as a tabular rib having a through hole to suitably adjust its strength. Also, the present invention includes a tabular rib that is reinforced by means of rigid material or the like. Further, for the reason of efficiency of molding process, mold structure, or design in view of stress, the tabular rib may have a thick walled portion at its opposite ends connected to the tabular holding portion.

In the impact-absorbing member of the present invention, the plurality of tabular ribs are arranged spaced apart in the load input direction from one another, as shown in FIG. 7. Additionally, the impact load input portion 35 which functions in this embodiment as the tabular connecting portion (35) (hereinafter referred to as the "tabular connecting portion (35)") can be disposed parallel to and between the tabular ribs in order to tune entire stiffness of the member, for example. It should be understood that the tabular connecting portion (35) in FIG. 7 is not necessarily to be more strength than the tabular ribs 1, 2, 13. For instance, any tabular connecting portion irrespective the strength thereof may be disposed to be parallel to the tabular ribs, in the present invention.

What is claimed is:

1. An elongated impact-absorbing member, which is made of synthetic resin material, and is adapted to be disposed in a load-receiving member struck by an impactor in a portion thereof that is struck by the impactor, the impact-absorbing member comprising:

a plurality of tabular ribs extending in a direction orthogonal to an impact load input direction of impact load produced by striking by the impactor, and being disposed spaced apart in the impact load input direction such that all of the plurality of tabular ribs are substantially parallel to one another; and a load transmitting member connected with width-wise opposite ends of the respective tabular ribs so as to extend between the tabular ribs on a diagonal with respect to the impact load input direction, for transmitting to each of the plurality of tabular ribs the impact load in a form of tensile load directed in a lateral direction, wherein differing levels are established for at least one of: tensile stiffness in the plurality of tabular ribs; and transmission efficiency of the tensile load by the load transmitting member, so that load-deformation characteristics of some of the plurality of tabular ribs differ in the impact load input direction.

2. An elongated impact-absorbing member according to claim 1, wherein tensile stiffness in the plurality of tabular ribs are established at different levels by means of varying at least one of a dimension and a material of the ribs.

3. An elongated impact-absorbing member according to claim 1, wherein the plurality of tabular ribs are arranged such that overall tensile stiffness of the tabular ribs situated on a first side with respect to a center in the impact load input direction is greater in comparison to overall tensile stiffness of the tabular ribs situated on an other side, and wherein the impact-absorbing member is attached to the load-receiving member at the other side where the overall tensile stiffness of the tabular ribs is lower so that the impact load is input to the first side where the overall tensile stiffness of the tabular ribs is higher.

4. An elongated impact-absorbing member according to claim 1, wherein the load transmitting member has symmetrical shape at opposite lateral sides with respect to lateral center lines of respective tabular ribs.

5. An elongated impact-absorbing member according to claim 1, wherein the load transmitting member differs in shape from one side to an other side in the impact load input direction.

6. An elongated impact-absorbing member according to claim 1, wherein the plurality of tabular ribs and the load transmitting member are integrally formed.

7. An elongated impact-absorbing member according to claim 1, wherein the load transmitting member is arranged in a hollow tube shape overall, and includes tabular holding portions transmitting the impact load to the plurality of tabular ribs while having a shape producing bending moment that is outwardly convex during input of the impact load, respectively.

8. An automotive impact-absorbing member in a form of a molded article formed in predetermined shape of a resin material, comprising:
  a plurality of tabular ribs disposed spaced apart and parallel to one another so as to extend in a direction orthogonal to an impact load input direction such that all of the plurality of tabular ribs are substantially parallel to one another; and
  a tubular member having an impact load input portion situated to a front side of the tabular ribs in the impact load input direction for receiving input impact load, and multiple pairs of tabular holding portions connected respectively at a first end thereof to two ends of the tabular ribs and disposed on a diagonal so as to approach one another at increasing distance away from the first end in a direction perpendicular to the tabular ribs, and that in association with deformation of the impact load input portion during impact load input induce in the tabular ribs tensile deformation such that the two ends thereof move apart, wherein the plurality of tabular ribs are constituted such that those to back side in the impact load input direction have lower tensile yield load than those to the front side.

9. An automotive impact-absorbing member according to claim 8, wherein the tabular rib situated to the back side in the impact load input direction is thinner and has smaller tensile yield load than the tabular rib situated to the front side.

10. An automotive impact-absorbing member according to claim 8, wherein a pair of the tabular holding portions connected to opposite ends of the tabular rib situated to the back side in the impact load input direction have a smaller bending stiffness than another pair of the tabular holding portions connected to opposite ends of the tabular rib situated to the front side.

11. An automotive impact-absorbing member according to claim 8, wherein a thickness of the tabular holding portions is greater than a thickness of the tabular ribs.

12. An automotive impact-absorbing member according to claim 8, wherein each of the tabular holding portions has greater thickness in a center portion thereof than at two end portions thereof.

13. An automotive impact-absorbing member according to claim 8, wherein the tubular member includes tabular connecting portions each connecting opposed ends of circumferential adjacent ones of the tabular holding portions.

14. An automotive impact-absorbing member according to claim 8, wherein the impact load input portion has greater width in a circumferential direction than a tabular connecting portion located furthest to the back side.

15. An automotive impact-absorbing member according to claim 8, wherein a slit is formed extending in an axial direction between distal ends of the pair of tabular holding portions situated on a most back side, and fastening portions are disposed on both side of the slit in an axis perpendicular direction.

16. An automotive impact-absorbing member according to claim 8, wherein the plurality of tabular ribs includes a first tabular rib situated to the front side in the impact load input direction, and a second tabular rib situated to the back side in the impact load input direction, and the tubular member includes the impact load input portion, a pair of first tabular holding portions connected respectively at one ends thereof to two ends of the first tabular rib and connected at an other ends thereof to the two ends of the impact load input portion, a pair of second tabular holding portions connected respectively at one ends thereof to two ends of the second tabular rib, a first tabular connecting portion connecting together other ends of the pair of second tabular holding portions, and a pair of second tabular connecting portions connecting together the first pair of tabular holding portions and the one ends of the pair of second tabular holding portions.

17. A method of producing an elongated impact-absorbing member, which is made of synthetic resin material, and is adapted to be disposed in a load-receiving member struck by an impactor in a portion thereof that is struck by the impactor, the impact-absorbing member comprising the steps of:
  providing a plurality of tabular ribs extending in a direction orthogonal to an impact load input direction of impact load produced by striking by the impactor, and being disposed spaced apart in the impact load input direction such that all of the plurality of tabular ribs are substantially parallel to one another;
  providing a load transmitting member connected with width-wise opposite ends of the respective tabular ribs so as to extend between the tabular ribs on a diagonal with respect to the impact load input direction, for transmitting to each of the plurality of tabular ribs the impact load in a form of tensile load directed in a lateral direction; and
  establishing differing levels for at least one of: tensile stiffness in the plurality of tabular ribs; and transmission efficiency of the tensile load by the load transmitting member, so that load-deformation characteristics of some of the plurality of tabular ribs differ in the impact load input direction.

* * * * *